United States Patent [19]

Kaufmann et al.

[11] Patent Number: 4,984,247
[45] Date of Patent: Jan. 8, 1991

[54] DIGITAL RADIO TRANSMISSION SYSTEM FOR A CELLULAR NETWORK, USING THE SPREAD SPECTRUM METHOD

[75] Inventors: Hans Kaufmann, Gossau; Roland Kueng, Wolfhausen; Urs Grob, Goldach; Arnold Welti, Brugg, all of Switzerland

[73] Assignee: Ascom Zelcom AG, Hombrechtikon, Switzerland

[21] Appl. No.: 414,253

[22] Filed: Sep. 29, 1989

[30] Foreign Application Priority Data

Sep. 29, 1988 [CH] Switzerland ............ 03628/88

[51] Int. Cl.$^5$ ............................................. H04K 1/00
[52] U.S. Cl. .................................................. 375/1
[58] Field of Search ........................................ 375/1

[56] References Cited

U.S. PATENT DOCUMENTS

| | | | |
|---|---|---|---|
| 4,189,677 | 2/1980 | Cooper et al. | 375/1 |
| 4,222,115 | 9/1980 | Cooper et al. | 375/1 |
| 4,355,399 | 10/1982 | Timor | 375/1 |
| 4,392,231 | 7/1983 | Henry | 375/1 |
| 4,479,226 | 10/1984 | Prabhu et al. | 375/1 |
| 4,554,668 | 11/1985 | Deman et al. | 375/1 |

*Primary Examiner*—Salvatore Cangialosi
*Attorney, Agent, or Firm*—Burns, Doane, Swecker and Mathis

[57] ABSTRACT

A base station (BS) and mobile user stations (MS) each with a transmitter (S), a receiver (E) for multipath reception and a control unit (ST) are provided in each cell. Exactly one set of several sequence sets of the auxiliary function used for spectrum spreading is allocated to each cell. Sequences of several sets in pairs have the property that the absolute values of the normalized periodic cross-correlation functions are much smaller than one and for sequences within a set the cross-correlation function in pairs is optimally small around the zero point. Data synchronous generation of the transmission signals takes place in the base station (BS) for all simultaneous connections and the data clock of the received signal is used as data clock of the transmission signal of the user station (MS).

Application for digital data transmission in buildings and local areas for the configuration of a so called cordless LAN are considered.

23 Claims, 11 Drawing Sheets

$h1 = (h_{1,0}, h_{1,1}, \ldots, h_{1,10})$ $h2 = (h_{2,0}, h_{2,1}, \ldots, h_{2,10})$ $a1 = (a_{1,0}, a_{1,1}, \ldots, a_{1,9})$ $a2 = (a_{2,0}, a_{2,1}, \ldots, a_{2,9})$

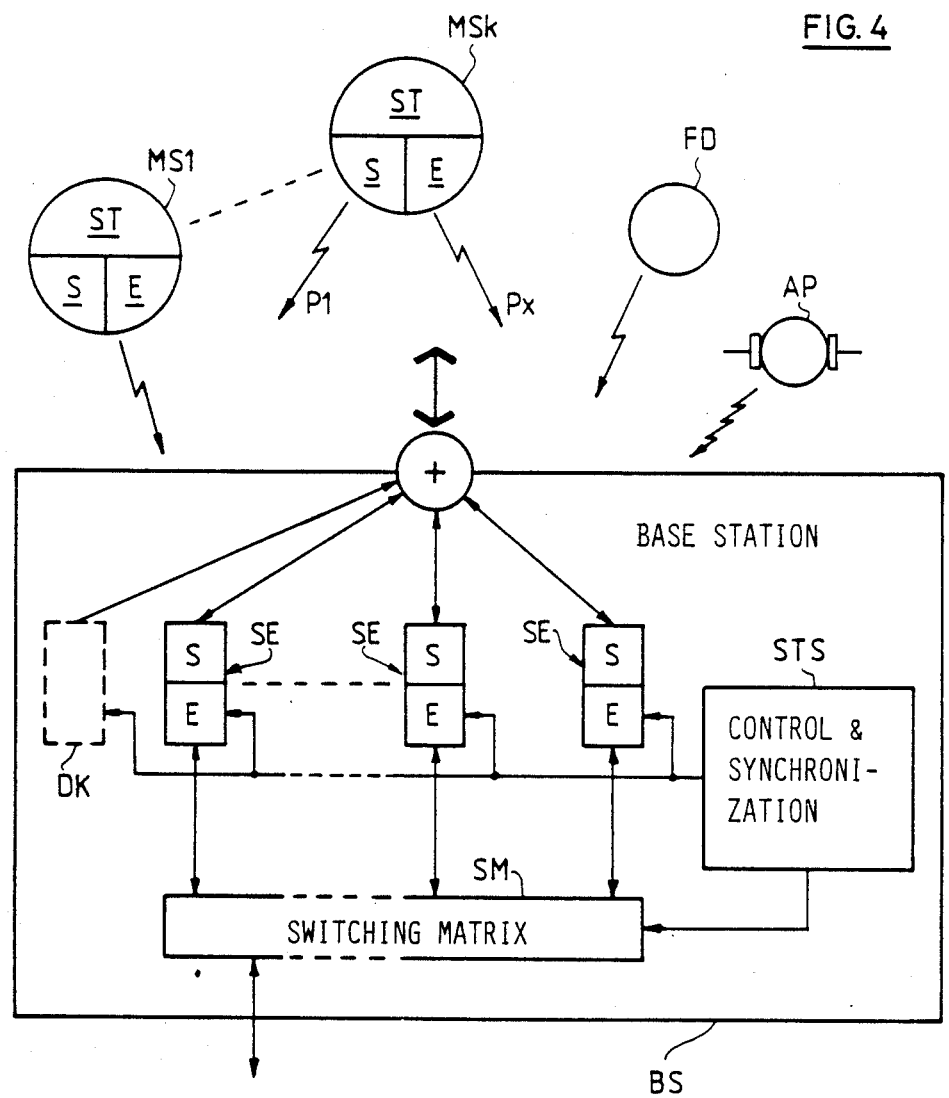

| MZ1 | | MZ2 | | MZ3 | | MZ4 | | MZ5 | | MZ6 | | MZ7 | | MZ8 | | MZ9 | | MZ10 | |
|---|---|---|---|---|---|---|---|---|---|---|---|---|---|---|---|---|---|---|---|
| a1 | a2 | a1 | a2 | a1 | a2 | a1 | a2 | a1 | a2 | a1 | a2 | a1 | a2 | a1 | a2 | a1 | a2 | a1 | a2 |
| 0700 | 0000 | 0000 | 1060 | 1127 | 0645 | 1604 | 0156 | 1653 | 1732 | 1303 | 1435 | 0011 | 0064 | 1053 | 0602 | 1322 | 0540 | 1473 | 1443 |
| 1454 | 0643 | 1043 | 0346 | 1363 | 1177 | 0216 | 1354 | 0442 | 1606 | 1720 | 1504 | 1646 | 0117 | 1557 | 1221 | 1075 | 1146 | 1021 | 0355 |
| 1075 | 1216 | 1614 | 1027 | 0746 | 0751 | 1157 | 1417 | 0742 | 0766 | 1554 | 0256 | 0551 | 1324 | 1605 | 1041 | 0642 | 1477 | 1514 | 1545 |
| 0556 | 1571 | 0740 | 0037 | 0076 | 1577 | 1355 | 1541 | 1136 | 0504 | 1367 | 1425 | 0750 | 0532 | 0202 | 1300 | 1246 | 1370 | 1363 | 1444 |
| 1324 | 1145 | 0315 | 0215 | 1677 | 1554 | 0266 | 1472 | 1405 | 1472 | 0475 | 0246 | 0532 | 0250 | 0142 | 1106 | 1303 | 0244 | 1622 | 1350 |
| 1136 | 0774 | 1252 | 0242 | 0550 | 1114 | 0740 | 1270 | 0636 | 0705 | 1707 | 1070 | 1202 | 1304 | 1535 | 0713 | 0704 | 0714 | 1407 | 0176 |
| 1407 | 1564 | 0073 | 0723 | 1104 | 0765 | 0715 | 0637 | 1164 | 1425 | 1557 | 0603 | 1050 | 1056 | 1272 | 1146 | 0420 | 1677 | 1236 | 1360 |
| 0761 | 0714 | 1350 | 0562 | 0765 | 0076 | 1275 | 1067 | 1744 | 0565 | 0051 | 0167 | 0352 | 1772 | 0633 | 0345 | 0674 | 0667 | 0732 | 1221 |
| 1077 | 0115 | 0751 | 0324 | 0642 | 1277 | 0575 | 0736 | 0672 | 0703 | 1651 | 1532 | 0536 | 0064 | 0451 | 0714 | 1244 | 0250 | 1727 | 0556 |
| 0040 | 0207 | 0345 | 0205 | 0260 | 1640 | 0103 | 0242 | 1714 | 1327 | 1360 | 1202 | 0475 | 0072 | 0742 | 0517 | 0001 | 1407 | 0730 | 0562 |
| 0236 | 1700 | 0171 | 1436 | 0041 | 1431 | 1204 | 1420 | 1527 | 1151 | 0654 | 1674 | 0013 | 0336 | 0342 | 0030 | 1126 | 0231 | 1436 | 1674 |
| 0703 | 1164 | 0200 | 1243 | 0726 | 0177 | 0030 | 0114 | 1104 | 1777 | 1126 | 0576 | 0075 | 0655 | 1227 | 0432 | 0523 | 0350 | 0276 | 1657 |
| 0030 | 0764 | 1245 | 1030 | 1524 | 1263 | 1452 | 1632 | 0113 | 1606 | 0717 | 1060 | 1132 | 1744 | 1724 | 0747 | 1124 | 1452 | 0261 | 1162 |
| 0241 | 0256 | 0744 | 0733 | 1033 | 1530 | 1643 | 1216 | 0335 | 0455 | 1415 | 0163 | 1450 | 0205 | 0212 | 0640 | 1066 | 1175 | 0053 | 1255 |
| 1555 | 1002 | 0765 | 0416 | 0054 | 1662 | 1561 | 0211 | 1545 | 0671 | 1700 | 0764 | 0760 | 0564 | 1705 | 1164 | 1445 | 1610 | 1240 | 1621 |
| 1304 | 0367 | 1531 | 1257 | 1104 | 0155 | 1027 | 1370 | 0157 | 0051 | 0406 | 1442 | 1137 | 0124 | 0114 | 1764 | 1712 | 0640 | 0732 | 1755 |
| 0256 | 0166 | 0133 | 0374 | 0720 | 0623 | 1122 | 1746 | 0442 | 0466 | 1771 | 0772 | 0402 | 0307 | 1471 | 0570 | 0454 | 1631 | 1355 | 1504 |

FIG. 6a

| MZ11 | | MZ12 | | MZ13 | | MZ14 | | MZ15 | | MZ16 | | MZ17 | | MZ18 | | MZ19 | | MZ20 | |
|---|---|---|---|---|---|---|---|---|---|---|---|---|---|---|---|---|---|---|---|
| a1 | a2 | a1 | a2 | a1 | a2 | a1 | a2 | a1 | a2 | a1 | a2 | a1 | a2 | a1 | a2 | a1 | a2 | a1 | a2 |
| 1736 | 0234 | 1623 | 1711 | 0476 | 0257 | 1147 | 1213 | 0756 | 0077 | 1632 | 1703 | 0661 | 1376 | 0545 | 0451 | 1675 | 0764 | 0145 | 1743 |
| 0037 | 1434 | 0656 | 1244 | 0436 | 1705 | 0052 | 1705 | 1177 | 1740 | 0137 | 1771 | 0551 | 1215 | 1774 | 0247 | 1024 | 1105 | 1142 | 0372 |
| 0342 | 1112 | 0222 | 1453 | 0115 | 1223 | 1352 | 0552 | 1505 | 1373 | 0526 | 1110 | 0333 | 1275 | 1661 | 1156 | 1273 | 0740 | 0030 | 0503 |
| 1531 | 1102 | 1742 | 1046 | 0276 | 0605 | 1772 | 1120 | 1546 | 0644 | 0725 | 0315 | 0323 | 1443 | 1146 | 0716 | 1302 | 0311 | 1331 | 0734 |
| 0520 | 1163 | 0455 | 0076 | 1310 | 0673 | 1072 | 1023 | 0347 | 1203 | 0561 | 1301 | 1264 | 1700 | 0662 | 0573 | 0543 | 1340 | 1533 | 1230 |
| 0274 | 0352 | 0747 | 0351 | 1267 | 1562 | 0545 | 0112 | 0256 | 0662 | 1475 | 1613 | 1203 | 1402 | 0730 | 0431 | 1013 | 1224 | 0300 | 0323 |
| 1410 | 0060 | 1352 | 0033 | 0173 | 0061 | 0542 | 1655 | 0116 | 1561 | 1225 | 0147 | 1271 | 1074 | 0553 | 1242 | 0373 | 1335 | 0044 | 1257 |
| 0054 | 1041 | 0420 | 0607 | 0725 | 1173 | 1175 | 1311 | 1355 | 1023 | 1042 | 0262 | 1446 | 0451 | 0142 | 1103 | 1156 | 1362 | 0452 | 0513 |
| 0357 | 1226 | 0754 | 0630 | 1027 | 1124 | 1505 | 1323 | 0412 | 1566 | 0664 | 1655 | 0376 | 0536 | 0554 | 0021 | 1325 | 0743 | 0606 | 1032 |
| 0321 | 0676 | 0764 | 1313 | 1522 | 0417 | 1472 | 0636 | 1424 | 0542 | 0702 | 1030 | 1617 | 1236 | 1436 | 0605 | 0232 | 1365 | 0470 | 0356 |
| 0713 | 0127 | 0220 | 0157 | 0047 | 1437 | 1271 | 1764 | 1122 | 0523 | 1231 | 0463 | 0414 | 0060 | 1455 | 0601 | 1633 | 0230 | 0730 | 1121 |
| 0667 | 0163 | 0356 | 0337 | 0063 | 0424 | 0467 | 0076 | 1664 | 1677 | 0514 | 0066 | 1243 | 0344 | 1443 | 0121 | 1563 | 0543 | 0237 | 0034 |
| 0705 | 0105 | 0176 | 1352 | 0114 | 0672 | 1220 | 1455 | 1765 | 1654 | 1174 | 1337 | 0317 | 0662 | 1756 | 0334 | 0303 | 0606 | 1023 | 0467 |
| 1324 | 0740 | 1760 | 0466 | 1442 | 0665 | 0317 | 1412 | 0116 | 1152 | 1301 | 1435 | 1210 | 0072 | 1017 | 0160 | 1714 | 0001 | 1547 | 1367 |
| 0672 | 1341 | 1060 | 1271 | 1471 | 1147 | 1116 | 1210 | 0724 | 0524 | 0033 | 0656 | 0214 | 1117 | 1154 | 0172 | 0242 | 1270 | 0010 | 1031 |
| 1626 | 1523 | 0453 | 1163 | 1070 | 0276 | 1273 | 0731 | 0571 | 1447 | 0770 | 0706 | 1010 | 0211 | 0550 | 0276 | 0312 | 1403 | 0660 | 0675 |
| 1177 | 0053 | 1315 | 1745 | 1716 | 0361 | 0745 | 0241 | 0515 | 1163 | 0327 | 1464 | 0356 | 1526 | 1310 | 1705 | 0575 | 0051 | 0254 | 0416 |

FIG. 6b

DIGITAL RADIO TRANSMISSION SYSTEM FOR A CELLULAR NETWORK, USING THE SPREAD SPECTRUM METHOD

BACKGROUND OF THE INVENTION

The spread spectrum technique is based on the interchangeability of signal/noise ratio and bandwidth. Spread spectrum systems (SSS) employ an auxiliary function for spectrum spreading. The waveform of this function is known to the receiver. This results in the highly advantageous property that these systems can operate even under very difficult signal/noise ratios. The auxiliary functions employed may be signals which themselves have a large bandwidth and transmit this to the transmission signal when linked with the information signal. Due to the large product of time x bandwidth an advantageous autocorrelation function (AKF=) may be produced, with a sharp peak at the origin and low side lobe values, and the necessary synchronization of the code sequences forming the auxiliary functions may be produced in the receiver by means of this property.

Another property of SSS is that several spread spectrum signals can be transmitted simultaneously in one and the same channel of a given bandwidth under the condition that the auxiliary functions of different users differ distinctly in their cross-correlation properties. It is thereby possible to realise networks with multiple access (Code Division Multiple Access=CDMA). The nature of the spectrum of SSS to a certain extent allows operation on frequency bands which are already in use by narrow band services without significant interference between these two systems. Moreover, by using pseudorandom code sequences with short so called chip duration Tc (=smallest rectangular impulse duration of the auxiliary function), it is possible to resolve individual radio signals that are propagated over several natural paths (so called multipath connections), and utilize them effectively as diversity components.

This invention relates to a digital radio transmission system for a network built up of cells, using the spread spectrum technique, in which spreading of the spectrum is achieved at the transmission end by multiplication of the information carrying signal with an auxiliary function while despreading is brought about at the receiving end by utilizing the same auxiliary function, the system comprising several user stations within a cell, each station equipped with a transmitter, a receiver for multipath reception and a control unit, and further comprising a base station with a plurality of transmitter-receivers and a base control unit.

Systems of this type, in which spectrum spreading is brought about by multiplication of the information carrying signal with the auxiliary function, are known as Direct Sequence-Spread-Spectrum Systems (DS-SSS) (see, for example, R. C. Dixon: "Spread Spectrum Systems", John Wiley Interscience, 1984). The methods known in the literature for the realization of DS-SSS receivers (A. Baier: "A Low-Cost Digital Matched Filter for Arbitrary Constant-Envelope Spread-Spectrum Waveforms" IEEE Trans. Comm., Vol. COM-32, April 1984, page 354; M. Kowatsch: "Synchronisation in a Spread-Spectrum Communication Modem Based on SAW Convolvers", IEEE Milcom '84, Los Angeles, October 1984, page 9.5. 1; U.S. Pat. No. 4 672 658) may be roughly divided into two categories, the matched filter type and the correlation type receiver. Both processes aim at highly accurate synchronization auxiliary sequence in the receiver, with the transmission auxiliary sequence. The main parameter for the first type is the time x bandwidth product of the matched filter Nowadays, sufficiently high values can only be achieved with CCD (Charged Coupled Devices) and SAW (Surface Acoustic Wave) technologies. The advantage of the matched filter receiver is the rapid synchronization but the great disadvantage is the limitation of process gain of this technology, i.e. the limited correlation time and hence the period duration of the auxiliary function. The SAW technology has the disadvantage of a small dynamic range due to its high intrinsic losses while CCD are limited in the clock frequency and digital matched filters are not optimal due to the amplitude quantization and the chip surface required.

The correlation type receiver, on the other hand, has the disadvantage of a longer synchronization time, although this is not found to be a disadvantage in most applications. During the process of synchronization, the receiver code is shifted continuously or stepwise according to the time delay to the transmitter and correlated with the received signal until the maximum of the correlation function has been found, i.e. the residual shift is smaller than the chip duration. This search process is dependent upon the length M of the auxiliary function but there are no restrictions to the period duration of the auxiliary function.

A rough principle of operation is already known from the above literature by R.C. Dixon. It is also known that the receiver structure can be extended so that several correlations with displaced auxiliary functions can take place simultaneously. This leads to somewhat more rapid acquisition (finding of the synchronous moment in time) and when there are several propagation paths, these may each be correlated synchronously independently of one another so that the natural diversity of the different paths can be utilized. H. Ochsner describes such an architecture in "An Antimultipath Spread-Spectrum Receiver and its Application to Portable Radio Telephone", IEEE Globecom '86, Houston, December 1986, page 31.7.1, but without giving any practical details for realizing such a system. Ochsner also fails to disclose any strategy for initial synchronization and its maintenance.

SUMMARY OF THE INVENTION

The present invention serves to provide a DS-SS system which can be realized in practice, having the basic structure of a receiver of the correlation type for several paths, which system is suitable in particular for digital data transmission in building and similar local areas for building up a network with cordless connections (so called cordless LAN).

To solve this problem according to the invention,
(a) exactly one set of several sequence sets of the spreading sequences used as auxiliary function is associated with each cell and the inverse of the spreading sequence is used as despreading sequence;
(b) sequences from different sets in pairs have the property that the absolute values of the normalized periodic cross-correlation functions are much less than one for all values;
(c) for sequences within a set, the cross-correlation function in pairs is optimally small around the origin;

(d) a data synchronous generating of the transmission signals takes place in the base station for all simultaneous connections; and (e) the data clock of the received signal is used as data clock of the transmitted signal of the given user station.

The following advantages are obtained from the system parameters and the properties of the code sequences according to the invention:

Non-synchronous DS interference signals (DS=direct sequence) are sufficiently suppressed.

Interference signals of DS transmissions within the same cell which arrive datasynchronously in a receiver are almost completely suppressed.

In the sum of the signals received by the user stations, the signal components of the various connections of a cell are data synchronous.

At the central station, the offset in the data clock between two DS signals from the same cell only depends on the difference in propagation time of the two signals.

Data clock regeneration is reliably carried out by means of special acquisition and tracking algorithms. The chosen receiver blocks allow for a wide margin for the choice of system parameters by systematic use of digital signal processing. Due to this choice of parameters, the SS technique may be adapted to digital speech transmission as well as to data transmission with practically any data rate. Compared with conventional radio transmission systems, the multipath spread is optimally utilized in buildings or in hilly terrain and there is a limited possibility of simultaneous operation with existing radio systems in the same frequency band.

BRIEF DESCRIPTION OF THE DRAWINGS

The invention is described below with the aid of an exemplary embodiment illustrated in the drawings, in which FIG. 4 is a block circuit diagram of the structure of a cell with possible interference influences, FIGS. 6a and 6b are each a table of the initial values for optimised code sets with two particular polynomials.

DETAILED DESCRIPTION OF THE PREFERRED EMBODIMENTS

Figure 1:
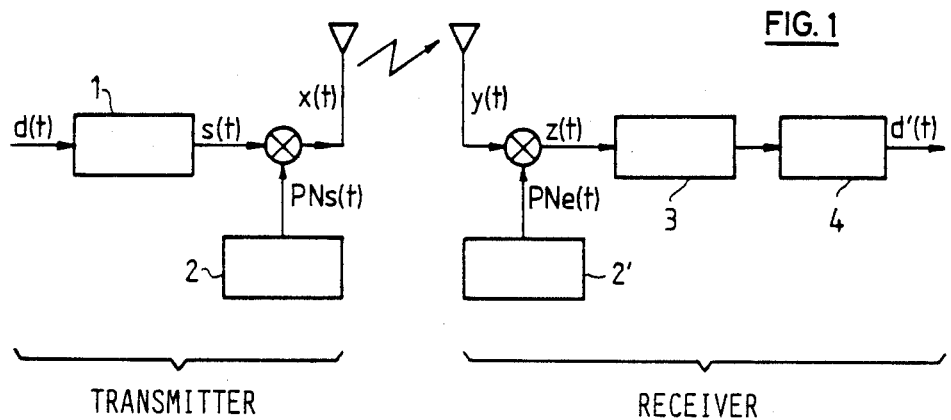
FIG. 1 is a block circuit diagram of a direct sequence spread spectrum system (DS-SSS)

FIG. 1 illustrates the principle of a direct sequence spread spectrum system (DS-SSS). In the transmitter, the data signal d(t) is modulated in a modulator 1. The signal s(t) obtainable at the output of the modulator 1 is coded with an auxiliary function or spreading sequence PNs(t) produced in a code generator 2, i.e. it is multiplied with this auxiliary function or spreading sequence, and is transmitted to a receiver as data signal x(t). The receiver decodes the received signal y(t) by means of the same auxiliary function PNe(t) produced in a local generator 2'. The signal z(t) obtained from this decoding passes through a band-pass filter 3 and a demodulator 4 at whose output the data signal d'(t) is obtainable.

Figure 2:
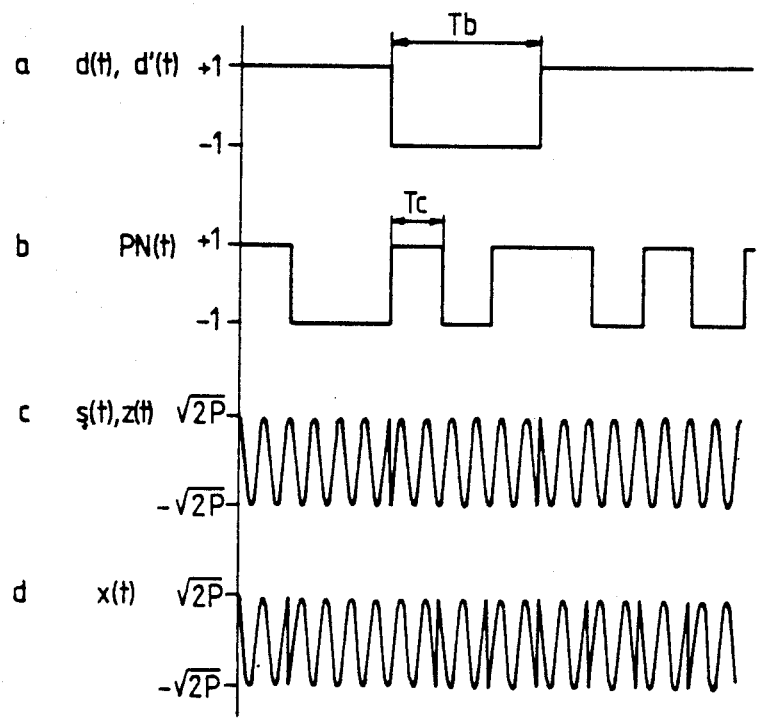
FIG. 2 is a diagram to illustrate the functions of the system.

The various signals are illustrated schematically in FIG. 2, where the signal d(t) or d'(t) is shown in line a, the auxiliary function PN(t) in line b, the signal s(t) or z(t) in line c and the signal x(t) in line d.

The auxiliary function PN(t) are pseudo-random binary code sequences which can easily be produced, for example by linear feedback shift registers. Their power spectrum approximately corresponds to a $(\sin x/x)^2$ shaped envelope with a first zero point at the frequency $1/Tc$ where Tc is the smallest rectangular impulse duration of the auxiliary function, the so called chip duration (line b). Tb (line a) is the symbol duration of the information carrying signal d(t), d'(t), which is chosen to be equal to an integer multiple of the chip duration Tc. In systems used in practice, functions of length M chip with a period duration of M.Tc are used repetitively for PN(t) functions. Typical values for $1/Tc$ are several 10 MHz and a typical value for M is, for example, 1023, and Tb is frequently chosen to be equal to M.Tc.

The principle of the cellular structure is know from the mobile radio in which several mobile users within the network can simultaneously maintain data connections or digital speech connections with other mobile or fixed stations. By reducing the size of the cell, such a cellular structure may be used as a microcellular system, for example in a building or a factory area.

Figure 3:
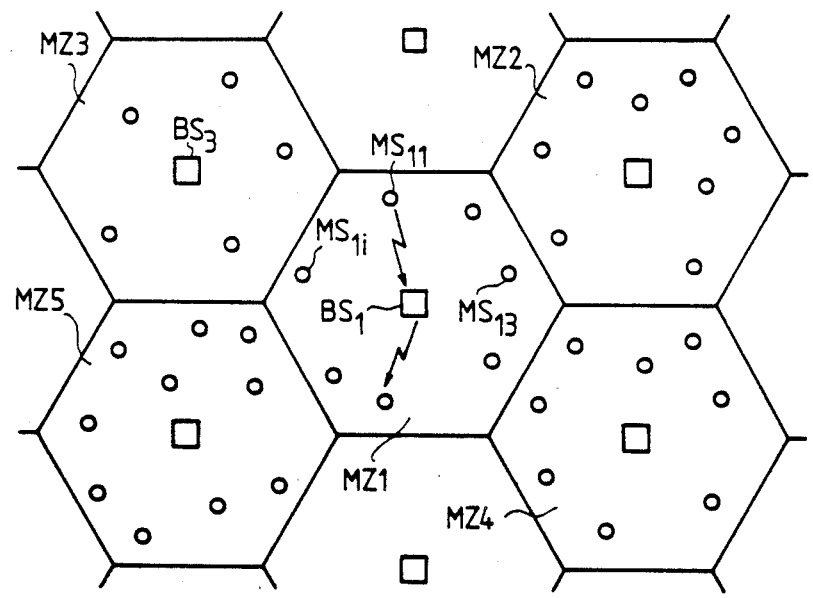
FIG. 3 is a schematic representation of the structure of a microcellular system.

FIG. 3 shows such a sub-division of the coverage area into microcells, where on microcell MZ may cover, for example, one story of a building or a single factory workshop. The system described below is suitable for operating a cordless LAN within a microcell MZ. The operation of independent microcells side by side is also provided for by the code selection. Radio communications beyond the microcells MZ and between them is not a subject matter of the present patent application. FIG. 4 shows the structure of a microcell with possible interference influences.

According to FIGS. 3 and 4, each cell MZ contains a number k of mobile stations MS1 to MSk and a central base station BS. Each mobile station (the two stations MS1 and MSk are shown schematically in FIG. 4) contains a transmitter S, a receiver E and a control unit SE. The central base station BS consists of n transmitter-receivers SE, a switching matrix SM with a connection, indicated by a double arrow, to external users connected by lines, a control stage STS for control and synchronization and an optional service channel transmitter DK. The number k of possible LAN users in one cell MZ is normally much greater than the number n of possible simultaneous connections corresponding to the n channels of the base station BS. The ratio of k to n may be, for example, 200 to 20. The connections within the cell proceed according to a simple plan, which will be described hereinafter.

All the connections between the users MS of a cell MZ and the base station BS use two broad frequency bands separated according to direction. This means that all transmitters SE of the users MS have a centre frequency of, for example, 914 MHz and all transmitters of the base station BS have a frequency of, for example, 959 MHz. The access procedure used is CDMA (multiple access) so that several radio connections can be effected simultaneously between the mobile stations and the base station, and these connections may be simplex, semiduplex or fully duplex.

As indicated in FIG. 4, the connection between a particular mobile station MS and the base station BS may be impaired by various interferences. Thus for any particular user, all the other users in the same cell may constitute interferences, which are determined by the cross-correlation properties of the codes user. Another disturbing factor is that the multi-path spread caused by reflection (paths P1, Px in FIG. 4) in buildings and their surroundings produces frequency selective fading of the received signal, which may give rise to considerable transmission faults in narrow band transmission systems. Electrical apparatus AP and narrow band radio services FD operating in the same frequency band are also sources of interference.

Successful operation of such a DS-SSS requires careful choice of the spreading code used and efficient realization of the receiver. The most important units for the latter are the digital signal processors and a flexible cell structure can be built up by optimum combination of the programmable transmitter and receiver blocks. The receiver is a correlation type receiver, the advantages of which, in particular the multipath diversity and the free choice of code length and data rate, come into full effect.

As already mentioned, the data signal in DS modulation is coded with a spreading sequence and the received signal is decoded by means of the inverse of the spreading sequence. In a binary sequence with the permitted states of "+1" and "−1", the despreading sequence and its inverse are identical. If the despreading sequence is produced in time in the demodulator such that the effects of coding and decoding virtually cancel each other at all times, then synchronism is said to exist between the spreading sequence in the received signal and the despreading sequence produced in the demodulator. For synchronous demodulation, therefore, the despread sequence must be the inverse of the spreading sequence and the time shaft between the sequence in the received signal and the despreading sequence produced in the receiver must be zero.

If the spreading sequence is repeated periodically, then the above mentioned time shift may be a multiple of the period duration. Systems in which the period duration of the spreading sequence is exactly equal to the data bit duration $T_b$ (FIG. 2) have special properties. Assuming that the code sequence consists of M chips and under ideal conditions each chip is represented by a rectangular impulse of duration $T_c = T_b/M$, the following conclusions may be made:

(a) For DS signals which arrive data synchronously at the receiver, i.e. in which the aforesaid time shift delta s of the individual signals at all times differs only by a multiple of the data bit duration $T_b = M.T_c$, a special situation arises if the demodulator code is synchronized to the code of an individual reception signal. In such a case, the delta s values of all signals are a multiple of $M.T_c$ and only even and odd correlation functions with the argument zero appear mathematically. For the wanted signal, odd and even autocorrelations assume the value M at the zero point, while for interference signals the odd and even cross-correlation functions are equal. The code sequences may be optimize in such a manner that these interference terms are reduced to the minimum.

(b) For incoming DS signals which are not synchronous with the despreading sequence, i.e. when delta s may assume any value, the odd and even correlation functions may also assume any values. This means that for interference signals, the values for cross-correlation function should be as small as possible while for non-synchronous wanted signals the values for autocorrelation function should be as small as possible.

On the basis of these two conclusions, the following parameters and measures for determining the code sequences are proposed for microcellular systems:

Exactly one set from several sequence sets is allocated to each cell.

Sequences from different sets must in pairs have the property that the absolute value of the normalized periodic cross-correlation functions is much less than one for all values. Non-synchronous DS interference signals are thereby sufficiently suppressed. It follows from this parameter that a sequence may only belong to one set and that versions of this sequence with a cyclic shift must not occur in any other set. PN sequences are types of sequences which satisfy these requirements, e.g. gold sequences and kasami sequences.

In the sequences within a set, the cross-correlation functions must in pairs be optimally small about the zero point. Interference signals of DS connections within the same cell which arrive data synchronously in a receiver are thereby almost completely suppressed.

At least one sequence with advantageous properties for synchronization is allocated per set.

In the central base station, the transmission signals are processed data synchronously for all simultaneous connections so that the signal components of the various connections of a cell are data synchronized in the summation signal received by the mobile stations.

The mobile stations employ the data clock of the reception signal as data clock of their transmission signal, with the result that in the base station, the offset in the data clock of two DS signals of the same cell depends only on he propagation time of the signals.

In addition, the base station may be arranged to transmit control signals for synchronizing the signals of the mobile stations and regulating their power.

Each cell has one set of n+1 spreading sequences, one of which has a particularly advantageous shape of its autocorrelation function for synchronization. This special sequence is used for operating the service channel DK which forms a simplex connection from the base station BS to the mobile stations MS and is reserved for the establishment of the connection. The other n sequences are used exclusively for data transmission, including signalling between the mobile stations MS and the base station BS.

Figure 5:
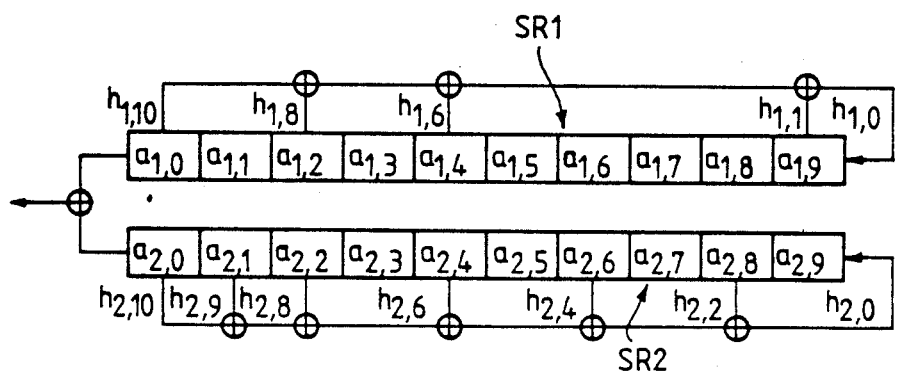
FIG. 5 shows a linear feedback shift register for the production of gold codes.

A computer search for optimum sequences of a family of god codes for fulfilling these criteria resulted in a total of 20 sets each with 17 sequences which may be used in a microcellular system. These sequences may be generated with two linear feedback shift registers SR1 and SR2 of the type illustrated in FIG. 5. The individual code generators 2, 2' (FIG. 1) for the 340 sequences differ only in the initial values a1, a2 of the two shift registers SR1 and SR2. These initial values are given in FIGS. 6a and 6b for the 340 optimized code sets with the polynomials h1=3025 (octal 8) and h2=2527 (octal 8), for cells 1 to 10 in FIG. 6a and cells 11 to 20 in FIG. 6b. The first sequence of each cell denotes the service channel sequence. If the 20 possible sequence sets are used again in a cell situated at some distance, then a cellular system with any number of cells may be built up by means of these optimized sequences.

To make full use of the advantages of the optimized codes, the code generators are synchronized in the base station so that the signals of all n transmitters of the base station arrive data bit synchronously at the mobile stations and hence the optimized correlation values are obtained. The mobile station in turn synchronizes its code sequence bit synchronously to the signal received from the base station. Since the arrival of the code sequence at the base station is then at the most delayed by an amount equal to twice the propagation time between base station and mobile station, the uncertainty of arrival time of the signal is minimal. At typical distances of up to 50 meters, this corresponds to only a few code chips. If, the spreading sequence is sent out exactly once per data bit, and the transmissions of all the channels in operation in the base station are synchronized, then a channel change (=sequence change) may take place without synchronization loss and the disadvantage of the longer synchronization time of the correlation receiver compared with that of a matched filter receiver is eliminated.

Each mobile station MS in which the transmitter and receiver unit SE (FIG. 4) has a programmable code generator knows all the sequences used for data transmission and the service channel code in its cell and may produce them itself. Each mobile station is characterized by a subscriber address which occurs only once in the system (identification), and the base station knows all the subscriber addresses of its cell. So long as the subscriber addresses can be allocated uniquely, any number of mobile stations may be allotted to a cell. It is only the number of mobile stations in operation at the same time which is limited, namely to the number n of the channels of the base station.

All mobile stations which are not actively in a connection are tuned in to the service channel, which plays an essential role for the establishment of connections If the base station has not occupied all n data transmission channels, it communicates the free channels to all mobile stations on the service channel. When a mobile station is required to be called from the base station, this also takes place on the service channel. Since all the transmitters can be programmed for any sequences, a free transmitter or, optionally, a transmitter specially reserved for this purpose, may be used for the service channel, as indicated by the service channel transmitter DK in FIG. 4.

Connections within the cell take place according to the following scheme:

(a) Base station BS calls mobile station MS: BS calls MS with a particular identification by way of the service channel and informs MS on which channel (sequence) it expects the reply. The mobile station then has the possibility of switching over to the required sequence and to start communication. BS at the same time begins a coarse synchronization in the corresponding channel (sequence),which can be carried out very rapidly owing to the small time uncertainty. Data transmission can then begin. Subsequent information such as signalling, power control, etc. are transmitted within the stream of data.

(b) Mobile station calls base station: MS learns from the information on the service channel on which channel (sequence) BS waits for the establishment of a new connection. It adjusts its code generator to this sequence and starts the call and at the same time transmits the address of the desired mobile station. BS then takes up communication with the desired mobile station and switches the two MS together by means of the switching matrix. During data transmission, BS monitors the signals between the two MS in order to separate the connection when the call is finished. In the meantime, it may itself allow further control data to flow in, e.g. for power control or synchronization of the MS.

Figure 7:
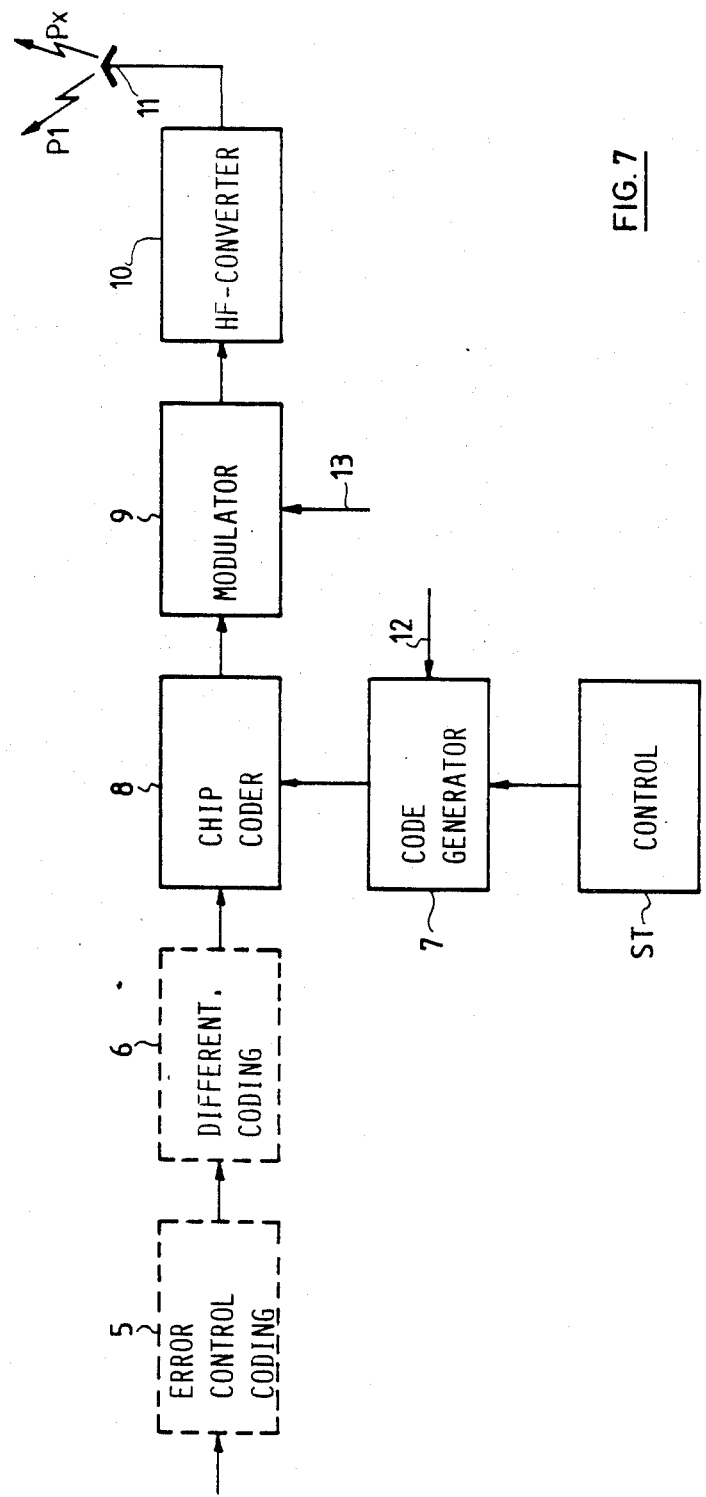
FIG. 7 is a block circuit diagram of a DS-SS transmitter.

FIG. 7 is a schematic circuit diagram of a spread spectrum transmitter S which is used both in the base station BS and in the mobile stations MS. It consists, as shown in the drawing, of the following blocks: coder 5 for error control, differential coder 6 (both optional),- programmable code generator 7, control unit ST, chip coder 8, modulator 9, HF converter 10 (optional) and antenna 11.

The programmable code generator 7 which is programmed by the control unit ST produces a certain spreading code from the code set defined above. For establishment of the connection, this is the service code (service channel sequence) and the code determined by the base station is subsequently selected in the base station as well as in the mobile station. The code sequence is normally produced once per data bit. In the practical embodiment, the code generator 7 is composed of two feedback shift registers SR1 and SR2 (FIG. 5) with programmable feedback and initial value registers. The codes produced are exactly controlled in time by a synchronization input 12 of the code generator 7 so that the base station produces all transmission codes in a well defined mutual phase position and can thus utilize the good cross-correlation properties of the specially selected codes.

It should be understood at this point that the receiver E (FIG. 4) also has a code generator. This code generator of the receiver may also be used by the transmitter S in the mobile stations but if the transmitter has its own code generator then the transmitter code is synchronized to the receiver code. This synchronization reduces the time uncertainty for the arrival of the signal of the mobile station at the base station to a few code bits (chips), with the result that the search time required for acquisition is drastically reduced.

The coder 5 for error corrections serves to provide the data which are to be transmitted with a redundancy for error recognition and/or error correction, for example with linear block codes or with convolutional codes. The differential coding by the coder 6 serves to simplify demodulation. The uncoded or suitably coded data are linked to the spreading code in the chip coder 8. In the simplest case, this is achieved by a modulo-2-addition of data and code.

In the modulator 9, the coded data are modulated on a carrier, preferably by binary phase shift-keying (BPSK), and filtered. The modulated signal is transferred to the antenna 11 for transmission, either directly or after conversion into a different frequency band by the HF converter 10. The modulator 9 of the mobile station may in addition contain a device for power control which receives control signals through an input 13 from the control unit ST which converts the control sequences received by the base station.

Figure 8:
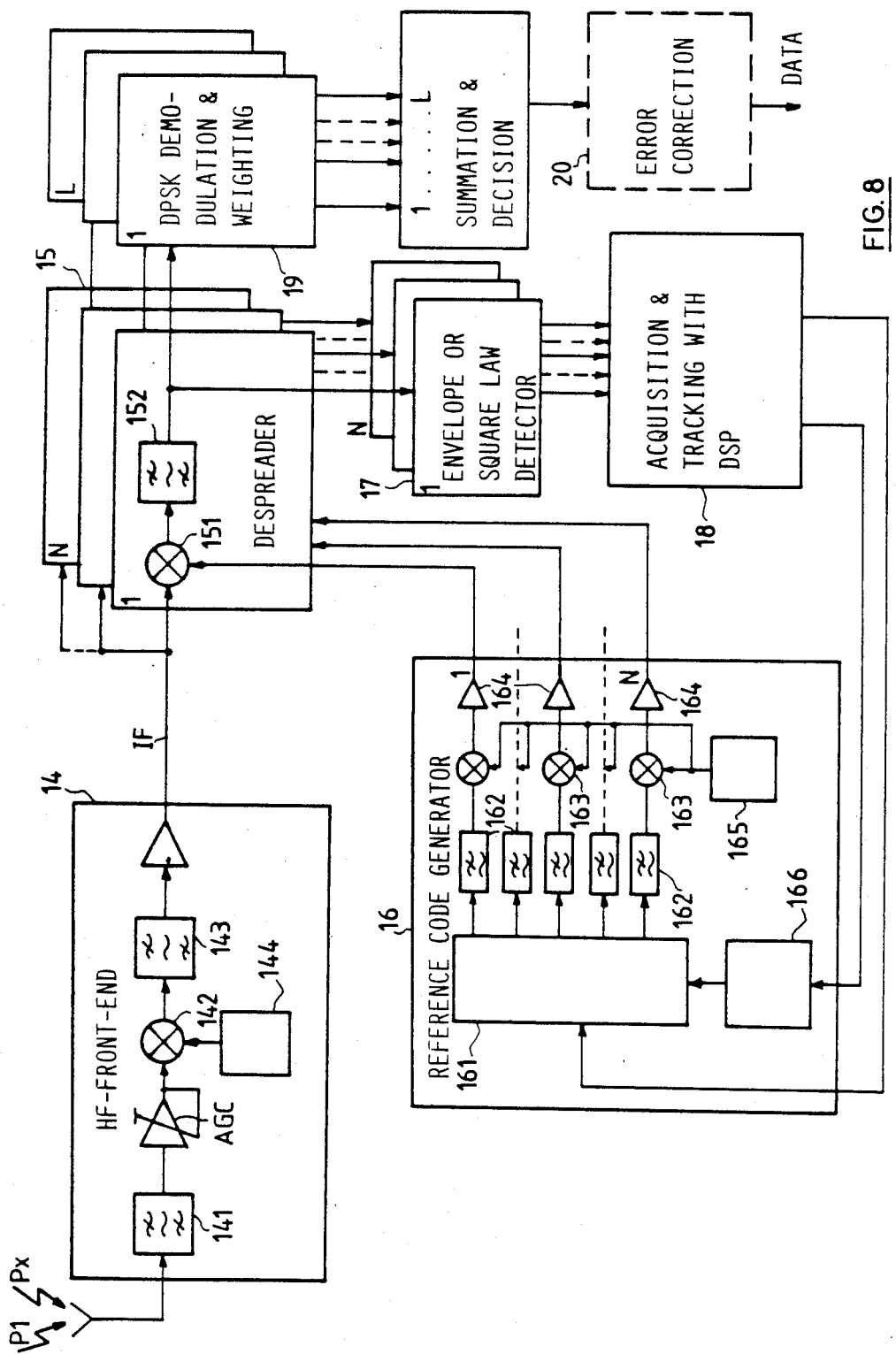
FIG. 8 is a block circuit diagram of a multipath receiver.

FIG. 8 is a block circuit diagram of a correlation receiver according to the invention, comprising the following units for the base station and for each mobile station: HF front-end 14, N-channel despreader 15, N-channel reference code generator 16, N-channel envelope or square law detector 17, acquisition and tracking circuit 18, L-channel demodulator 19 and an optional error control decoder 20.

The broad band reception signal reaching the antenna of the receiver by way of the paths P1 to Px is filtered in a band-pass filter 141 in the HF part 14 to suppress signals outside the frequency band used. The signal is then amplified and converted to an intermediate frequency IF (mixer 142, filter 143, local oscillator 144, for example with 889 MHz). An automatic gain control amplifier AGC controls the gain level so that narrow band interference signals are prevented from saturating the amplifier or over driving the correlators. The receiving signal lies in two broad frequency bands with a central frequency of, for example, 914 MHz and 959 MHz. The converted IF signal at the output of the HF front-end may have a central frequency of, for example, 70 MHz.

At the despreader stage 15, the IF signal is multiplied with a reference signal in a mixer 151 and is then band-pass filtered (filter 152). When synchronism exists between the spreading code in the IF signal and the code in the reference signal, despreading produces a narrow band signal of bandwidth about 2/Tb from the broad-band input signal of bandwidth about 2/Tc (FIG. 2). The band-pass filter 152 has a programmable bandwidth and suppresses the interference signals spreaded by the despreading process. This enables the bandwidth to be kept relatively large during acquisition to allow for a higher search rate.

The reference code generator 16 can be programmed flexibly and contains a stage 161 for simultaneously generating the received code for each of the N channels with any code phase. N versions of the same code shifted in time in relation to one another are thus produced. Each of the N channels contains a filter 162, a mixer 163 and an amplifier 164. The delay times between the individual code versions can be programmed individually for all the N channels. The resolution with which the shifts in relation to one another can be adjusted amounts to a fraction, preferably one half, of a chip. Stage 161 is clocked by a code clock oscillator 166 and the mixer 163 is fed by a local oscillator 165, for example of 80.7 MHz.

The despreaded signals are transmitted both to the envelope or square law detectors 17 and to the demodulators 19. The signal amplitude at the outputs of the N correlators (despreaders 15) is measured by the N detectors independently of the received data and the results are used for obtaining the control signals required for the acquisition (=coarse synchronization) and tracking (=fine synchronization) in the circuit 18.

In the acquisition and tracking circuit 18, the N detector signals are integrated over a time Ti (variable parameter) and converted by analog-digital conversion and transferred to a digital processor (in particular a digital signal processor, DSP). The integration time is controlled by the DSP. This enables the behaviour of the synchronization circuit to be continuously adapted to the instantaneous signal/ noise ratio. The control signals for controlling the N-channel reference code generator 16 are calculated by means of special algorithms and strategies. The processor at all times knows the delay times of the N channels of the generator 16 in relation to one another. It can therefore dynamically adapt the N channels optimally to the multipath profile according to the nature of this profile. The allocation of the channels may be chosen for optimum demodulation and code tracking. Additional functions may also be obtained, e.g. measurement of the signal/noise ratio. This built in intelligence allows for rapid acquisition of the received code and robust tracking in the case of multipath spread. In addition, the weighting of the individual N channels for the selection in the demodulator is calculated in the processor.

The advantages of the processor (DSP) lie mainly in the optimum utilization of the information concerning actual propagation conditions since the transmission channel is constantly measured in real time. In contrast to analog acquisition and tracking circuits, in which in most cases only weighted and usually also averaged) sums are used for the control process, the processor can obtain additional information from the N individual channels. For example, the delay times between the N channels of the generator 16 can be programmed in such a way that most of the channels obtain a very powerful reception signal. In an analog system, only limited flexibility is obtainable taking into account the circuit complexity involved. Individual channels may therefore sometime only receive noise or on the other hand, certain echo components may not be fully utilized because of the limited flexibility. Both these factors have a deleterious effect on the behaviour of the system, compared with the flexible solution.

Despreading of the transmitted data takes place in the demodulator 19. Both a choice of the best channel (selection combining) and a combination of the energies of different channels (equal gain or maximum ratio combining) may be carried out by suitable weighting of the individual N channels. After the bit decision, the error correction is carried out if suitable redundancy has been supplied by the transmitter.

In order that the signals of L receiving channels may be demodulated with the simplest possible means, DPSK (=Differential Phase Shift Keying) is chosen as primary modulation in the radio transmission system according to the invention. This eliminates the recovery of the carrier signal from the receiving signal, which would be necessary for a coherent demodulation of a PSK signal. In DPSK, the receiving signal, which is delayed by one bit duration Tb and which, in contrast to pSK, is noisy is used as pseudo coherent carrier signal. The following advantages are, however, obtained for realization with DPSK: the estimation of carrier frequency and phase is eliminated; demodulation is insensitive to Doppler shifts and there are less stringent demands on the stability of the oscillators.

Figure 9:
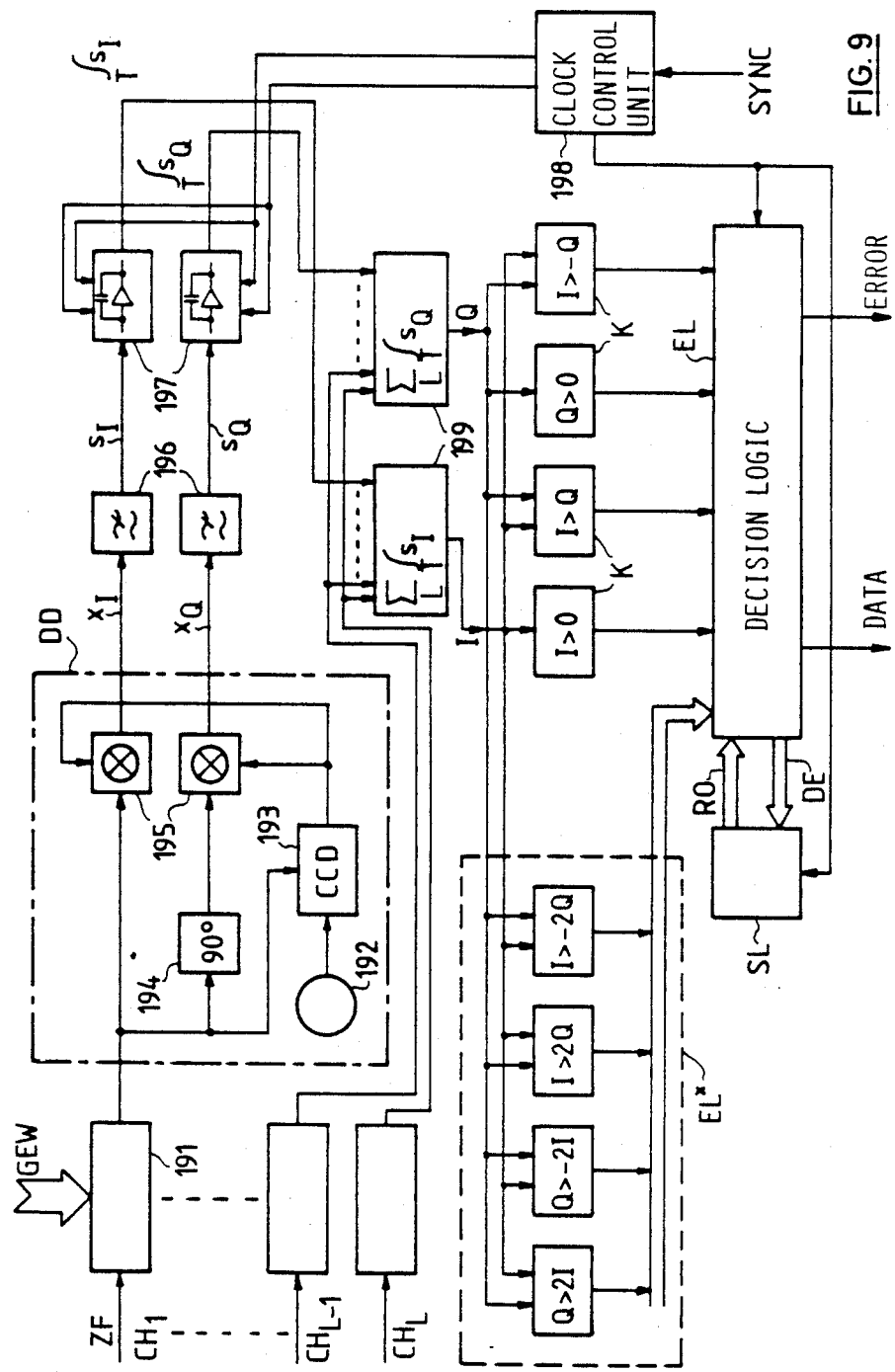
FIG. 9 is a block circuit diagram of the demodulator of the receiver of FIG. 8 and FIGS. 10, 11a, 11b, 12, 13, 14 and 15 are graphs to illustrate the operations.

FIG. 9 is a block circuit diagram of a DPSK demodulator 19 of FIG. 8. After despreading and band-pass filtering, in the despreading unit 15 (FIG. 8), the L correlator signals CH1 to CHL are brought into an intermediate frequency position of about 460 KHz and transferred to attenuators 191 which are individually adjustable for each of the L reception channels. Control of the attenuators 191 is carried out by the signal processor DSP (FIG. 8) which has acquired knowledge of the amplitude of the individual signals from the acquisition and tracking synchronization circuit 18 (FIG. 8). The multipath profile measured with the signal processor DSP serves to weight each signal according to its reception quality (one could use only the most powerful signal for demodulation, in which case a receiver known as best-of receiver or selection-diversity receiver would be obtained). Since this weighting depends mainly on the ratio of the various signal amplitudes, AGC (=Automatic Gain Control) is realized for the demodulator by common attenuation of all L signals.

FIG. 9 gives a detailed view of only one of the L reception channels for the correlator signals CH1 to CHL. As shown in the drawing, attenuation (attenuator 191) is followed by differential demodulation DD. This stage contains a clock oscillator 192, a CCD delay line 193, a 90° phase shifter 194 and two mixers 195.

The CCD delay line 193 serves to obtain signals which are delayed in relation to the input signals of the demodulators by the duration of an information bit (symbol duration). For optimum demodulation, the delay time Tb of the CCD elements should be an integral multiple of the period duration of the carrier signal but this would impose extreme demands on the quality of the oscillators and delay lines used and there would still remain a high degree of sensitivity in the presence of Doppler shifts. The DPSK demodulator 19 is therefore designed as a quadrature demodulator which demodulates not only the incoming signal but also a version of the received signal which has been rotated through 90° by the phase shifter 194. The output of stage DD therefore has two channels I and Q, one for the normal signal and one for its rotated version, and a mixer 195 is provided in each channel. Demodulation independent of frequency offset and Doppler shift is thus possible using component parts with standard quality and tolerances.

After filtering through low-pass filters 196, the output signal of the two mixers 195 are each connected to an integration stage which individually integrates the signals of the two channels over the duration Tb of an information bit. The time control of the integrate and hold devices must be synchronized with the symbol clock resulting from the acquisition and tracking processor (FIG. 8, circuit 18). This is symbollized in FIG. 9 by a clock control unit 198 activated by the circuit 19.

All signals SI of the I channels and all signals SQ of the Q channels are then summed in two stages 199. It can be seen at this point why the delay lines and the oscillators need not satisfy such stringent requirements of precision thanks to the quadrature modulation. If the summation signals of the I and Q channels are plotted on a rectangular coordinate system, a straight line may be drawn through the origin and the point of the signaL vector which is given by the I and Q components. Without noise, the information symbols determine the direction on this straight line of the signal vector, which is given by the I and Q components. The gradient of the straight line is determined by the ratio of the delay time of the CCD elements to the instantaneous period duration of the carrier signal. Fluctuations in the frequency of the oscillator and Doppler shifts thus result only in a rotation of the straight line about the origin of the coordinate system The gradient of the straight line may, however, be estimate in a decision logic and compensation is possible if the straight line does not rotate too rapidly.

Figure 10:
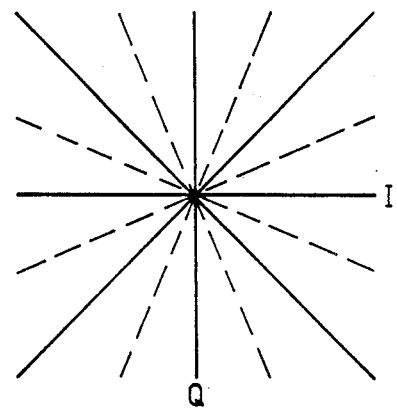

For making a decision about the data value of a transmitted information bit, the I/Q plane shown in FIG. 10 is subdivided into eight sectors (octants), the solid lines symbolizing the sector boundaries for the decision logic EL of the DPSK demodulator and the broken lines the sector boundaries for an optional additional part EL*. Four comparators K are provided at the input to the decision logic. By means of these comparators K it is possible to determine to which octant the incoming signals belong. If there is no noise component, the data symbol value may be estimated as follows:

Compare the sector for the current symbol with the sector in which the signals of the preceding symbol were situated. If these are the same or adjacent octants then the two symbols have the same value, otherwise they are different. Without noise, the rotation of the straight line from the zero point of the coordinates to the signals vectors depends only on the frequency offset and frequency drifts of the transmission and reception oscillators and on changes in the delay time of the CCD elements. Even if very inaccurate elements are used, the case that the straight lines for two successive symbols rotate through more than 45° (opening angle of a sector)is practically impossible In noise free surroundings, therefore, the demodulator can always decide correctly whether the polarity of a symbol has changed in relation to the preceding symbol. The actual data value can only be determined unambiguously if the uncertainty concerning the angle which the straight line is capable of assuming for a particular transmitted data value is substantially less than 180°. If this is not the case (large frequency offset), then there is uncertainty as to whether all the symbols were demodulated correctly or whether all symbols were demodulated with inversion. This uncertainty may, however, be eliminated by a preamble in the data to be transmitted. The decision logic can be described by means of a simple, easily integratable machine with eight possible states. The states represent the sector of the preceding signal vector. For each state there exists one mapping function which converts the identification of the possible sectors for the next symbol into the information "polarity the same" or "polarity changed" After recognition of the sector for the next symbol, mapping is performed and the machine enters the state representing the new sector.

If the signals supplied to the comparators in addition contain noise terms, any of the eight sectors can be detected for each transmitted symbol. However, in order to counteract slow drift phenomena of the oscillators, the probability of appearance of the decoded sectors can be determined by simple statistics using several symbols. The appropriate statistics logic is marked by the reference SL in FIG. 9. This gives the information as to which sector will contain the largest number of signal points. This sector and the one situated opposite to this sector with reference to the zero point of the coordinates may then be used as references to decide whether a "1" or a "0" has been transmitted. Two data lines RP and DO for the reference octants and the detected octants are therefore shown between the decision logic EL and the statistics logic SL in FIG. 9.

Figure 11A:
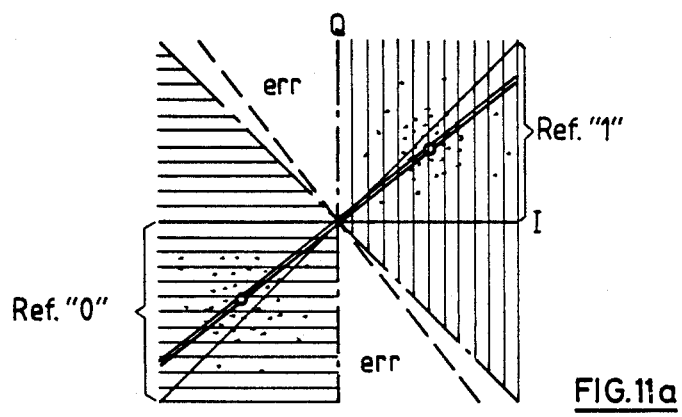

If a signal is detected in a sector adjacent to the reference octant, then the logic decides on the data value of the reference octant. A signal which falls into the octants not adjacent to the reference sectors produces an error signal. This is illustrated in the diagram of FIG. 11a. In this figure, the signal vectors in front of the comparators K are entered as points; the region for "0" is shaded by horizontal lines and that for "1" is shaded by vertical lines and the regions of the reference octants are marked accordingly. The straight line entered as a double line indicates the position of the signals in absence of noise, the broken straight line indicates the ideal decision limit and the dash dotted straight line indicates the realizable decision limit, and "err" marks the area of the error signals.

Figure 11B:
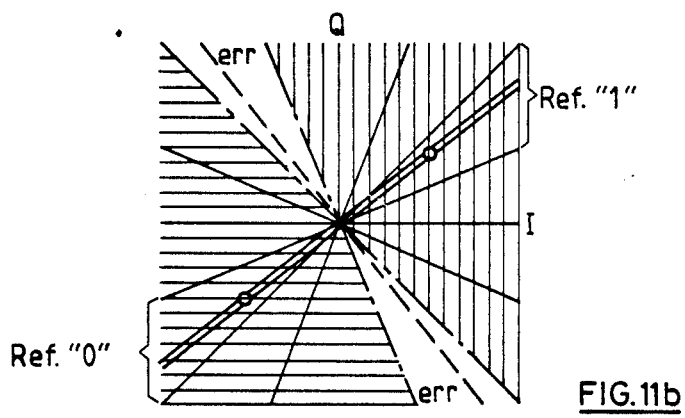

This quantization of signal vector/octant results in a loss of detection sensitivity which is greatest when the signal vectors without noise come to lie on a sector boundary. This problem may be dealt with by a finer sub-division into twice the number of sectors. The optional additional part EL* shown in FIG. 8 is used for this purpose. This part EL* constitutes a second decision logic with four additional comparators and enables the I/Q plane to be sub-divided into sixteen sectors. This is illustrated schematically in FIG. 11b in which the same symbols are used as in FIG. 11a. It is obvious from FIG. 11b that the "err" range of the error signals is greatly reduced. Even more precise estimation may be achieved if the signals are quantized after the summators 199 (FIG. 9) and then transferred to a signal processor for further processing.

The receiver described above is insensitive to frequency offset and Doppler shifts and depends only on a proper symbol synchronization, which is required for despreading anyway and therefore already provided. In an even simpler embodiment, the DPSK demodulator consists of only one realized channel (instead of L channels) and instead of the paths being weighted, the best of the I channels is selected for demodulation. Such a receiver is known as a best-of or selection-diversity receiver.

Figure 12:
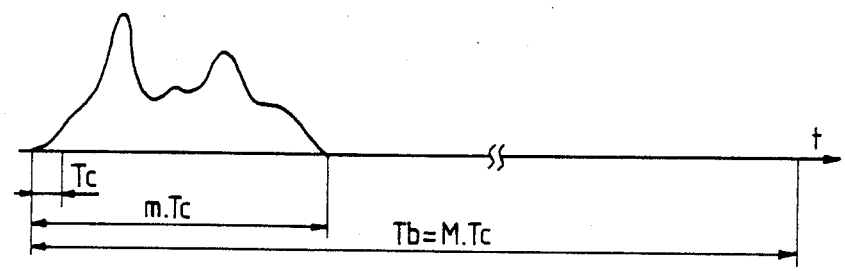

A particularly important part of an SS receiver is the synchronization circuit which has already repeatedly been mentioned above. FIG. 12 shows the absolute value of the impulse response of a possible channel, where Tc denotes the chip duration, Tb the data bit duration and M the processing gain. The duration in time m.Tc of the impulse response of the channel amounts to only fractions of the data bit duration Tb. For acquisition (coarse synchronization), a process based on measurement of the impulse response in the receiver is proposed for the system according to the invention. Since the receiver is designed for multiple path resolution, it has a reception window within which possible received signals can be seized If, for example, the receiver has N reception arms spaced apart by only one code chip, then the width of the reception window is $Tw = (N-1) \cdot Tc$.

Figure 13:
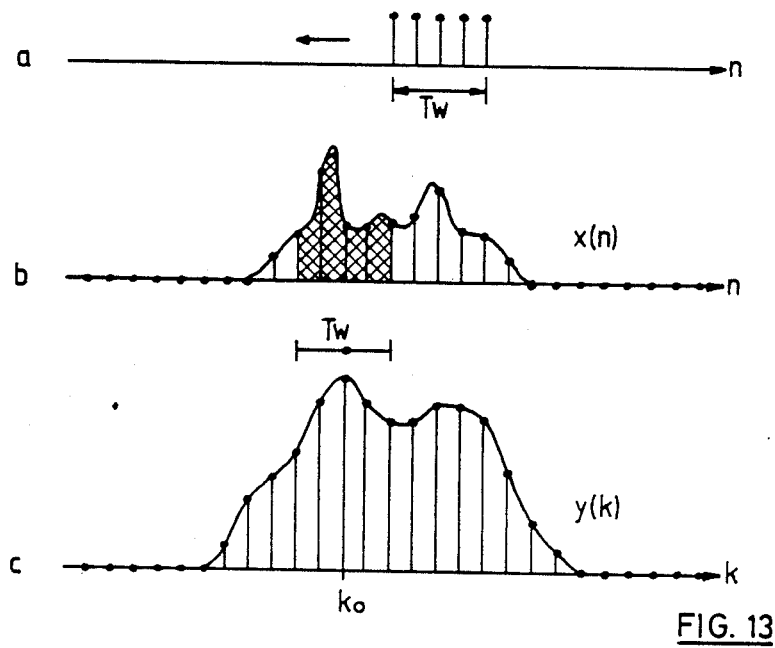

FIG. 13 shows the acquisition for N=5. The reception window Tw is shown in line a, the impulse response x(n) in line b and the energy distribution y(k) within the window as a function of the position of the window is shown in line c. The impulse response is measured by allowing the local code generator to slide against the code generator of the transmitter, the clock frequencies of the two code generators having an offset (continuous sliding correlator). Alternatively, the local code generator may be allowed to slide over the reception signal in discrete time intervals of epsilon x Tc (discrete sliding correlator) and, after despreading, the impulse response is then obtained in discrete time intervals epsilon times Tc. In FIG. 13, epsilon is taken to be equal to one.

During this sliding process, the associated energy entering the reception window Tw is always calculated. If the local code generator is left to slide over a whole code period, then the energy maximum can be detected at some point ko. After the sliding process, the reception window Tw must be centred about ko (line c) and the arrangement may then be switched over to fine synchronization (tracking), after a verification strategy is performed which is intended to confirm whether the energy maximum has indeed been detected. If not, a new acquisition may be started. In this verification, the mean value of all the energy values outside the reception window Tw is calculated and this noise value is compared with the energy in the reception window Tw of the next following integration interval. Taking the mean over several integration intervals increases the robustness of verification against brief signal fluctuations. It is thus mainly the signal/noise ratio which is tested. This coarse synchronization, which may be described mathematically as a correlation of the reception window Tw with the impulse response x(n) of the channel, is realized by means of the digital signal processor DSP (FIG. 8).

Tracking (fine synchronization) consists of an analog control circuit similar to the classical delay lock loop (DLL) but with a wider characteristic discriminator curve (S curve). Since the receiver has N reception paths, all its N paths may be taken into account for the characteristic discriminator curve. The S curve is thus equal in width to a reception window Tw. This width may be altered by switching individual paths on or off so that the S curve can advantageously be adapted to the impulse response of the channel. In cases of line-of-sight communication (no echo), a narrow S curve is better as the outer paths of a wide curve would only introduce noise into the system. When there are many echos, a wide S curve is better as the receiver then has more signal components available than with a narrow curve.

The processor may continuously scan the reception paths during tracking so that the intensity of the signals in the individual paths will always be known. The L reception paths which are taken into account for data demodulation may then be weighted by the processor from this information according to the intensity with which the individual echos are received. The processor may also fix a criterion for synchronization loss so that a new acquisition may be started. This is carried out by measurement of the signal energy in the reception window and by measurement of the noise energy at the edge of or outside the reception window by means of at least one reception path with appropriately shifted despreading code, followed by comparison of the resulting signal/ noise ratio with a threshold value. Another possible method is the comparison of the bit error rate in the data demodulator with a given threshold value. The combination of the two processes is advantageous because it is more reliable than one method alone.

For more effective suppression of noise, the outputs of the detectors must first be integrated over a selectable time and then sampled. If the signal/noise ratio is small, several impulse responses may be recorded and filtered in the process of acquisition so that an unequivocal energy maximum is obtained. A similar effect is obtained when the integration time is increased.

As may be seen from FIG. 12, the impulse response of the channel dies down after a few code chips. The duration of the impulse response thus very short compared to the data bit duration. This enables a different synchronization strategy to be employed, which does not require a control circuit for tracking.

Figure 14:
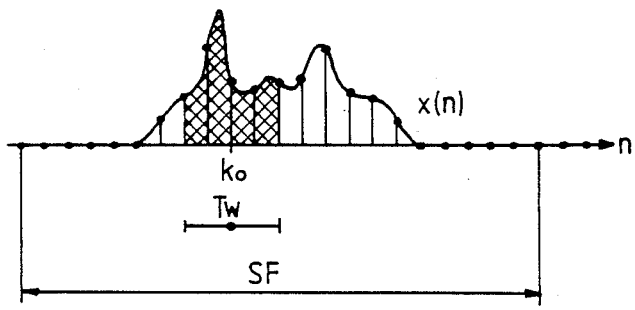

In this strategy, which is shown schematically in FIG. 14, acquisition is carried out by the above mentioned discrete sliding process which enables the position ko and the duration in time of the impulse response m.Tc to be known. The receiver then uses P of the total number N of reception paths for positioning the reception window Tw. The signal processor may use the remaining R (=N-P) paths for continuously scanning the impulse response of the channel in the background with respect to the instantaneous demodulation position without altering the position of the reception window. The width of the scanning window SF must be greater than the duration of the impulse response. After one scanning run, a new energy maximum may again be detected at the new position ko. The duration of the new impulse response is also known. The reception window with the P paths is now centred around the new ko. As a result, the reception window, following the channel in time, is always optimally centred and the maximum possible reception energy is always available to the demodulators.

With this process the analog DLL circuit for fine synchronization can be omitted. The section from the impulse response which supplies the most energy will therefore always fall within the reception window. The new width of scanning window will be adapted to the new impulse response and the weighting coefficients for demodulation can be readjusted. A new scanning run then begins. Since the scanning window covers only a few code chips, this scanning takes place so rapidly that the channel can be captured in real time. Verification of the decision may, of course, be carried out after each scanning run.

The signal/noise ratio S/N of the despreaded signal within the scanning window SF can be updated with each scanning run since the scanning window has been chosen to be wider than the impulse response. For this purpose, the noise which lies outside the impulse response but still within the scanning window and the signal from the impulse response are determined.

Thus, a synchronism detector based on the knowledge of the current S/N ratio can be built up and the system parameters (e.g. integration time for covering the impulse response, time constants for the control mechanisms) can be adjusted so that an adaptive system is obtained. The control magnitude for the system-AGC is obtained directly from the S/N ratio of the despreaded signal and optimized in order not to overload the broad band receiver stages. The width of the scanning window is adapted to the impulse response so that minimum scanning times result.

The reception window with the P paths and the weighting co-efficient for the data demodulator are made to follow the energy maximum of the particular scanning run with a time delay. If the S/N ratio is small, the mean value of several impulse responses from several scanning runs is obtained in a digital filter and the reception window is recentred only when a clear energy maximum has been detected, again with a time delay. A similar effect can be obtained by increasing the integration time. If the synchronism detector detects a synchronization loss, a simple, known scanning strategy is employed, e.g. the width of the scanning window is increased and a so called Z search strategy is introduced.

With this adaptive scanning method, the receiver always has knowledge as to which echos arrive with the greatest intensity. Since in the code generator tappings may be chosen with any desired delay, it is possible to allocate whichever are the L most powerful reception paths to the data demodulator.

Scanning leads to a purely digital signal processing solution of the synchronization problematics of a direct sequence spread spectrum system, which is advantageous for hardware integration. Due to the inherent precise operation of DSP algorithms, the control mechanisms are not subject to any aging drift, have no matching or tuning problems and are accurately reproducible. Flexible reaction to the reception conditions is ensured at all times.

A comparison of the system according to the invention with the state of the art reveals the following advantages of the system and of its application:

U.S. Pat. No. 4 672 658 describes how the multipath spread (which corresponds to a diversity) can be utilized in a PBX system. The greatest correlation value at the output of a matched filter is used for demodulation. Assuming that due to postal regulations a frequency band of at the most 20 MHz is available and a processing gain (spreading factor) of 30 dB or more (M greater than 1000) is required to be reached, a maximum data rate of 10 kbit per second is obtained, which is sufficient for many applications.

For a realization by the SAW technique, however, the convolver length is limited due to the size of the structural parts and losses. At the present state of the art, this limit restricts the maximum data bit duration to 20 micro-seconds, corresponding to a data rate of 50 kbit. This SAW technique and the above mentioned marginal conditions allow a maximum spreading factor (processing gain) of $M=256$.

Figure 15:
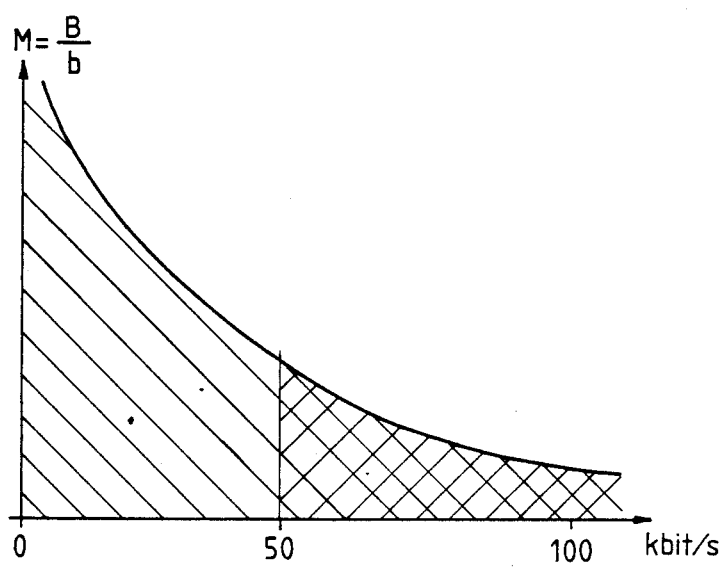

FIG. 15 is a diagram showing the processing gain M as a function of the data rate in kbit/s. The processing gain M is defined as $M=B/b$, where b is the data bandwidth and B is half the transmission bandwidth. The latter is constant and is fixed by postal regulations. The system according to the invention can be used in the whole of the shaded area but the SAW technique can only be used in the double shaded area. FIG. 15 shows that the system according to the invention with the correlation receiver described has the advantage that it enables a high processing gain to be obtained in the region of low data rates. The use of the receiver according to the invention is limited only by the realizable bandwidth of the HF input circuits and by the clock rates of modern digital circuits for spreading code generation. For practical purposes, limits will be set by postal regulations.

Due to the possibility of flexible choice of the system parameters, the following criteria can be taken into account when designing the system:
adaptation of the bandwidth and of utilization of the diversity to the conditions in the transmission channel (taking into account the multipath spread);
choice of the processing gain according to the number of users and the desired suppression of interference;
choice of the data rate according to the field of application of the system.

Applications of the SS technique to digital speech transmission (2·4 kbits/s to 64 kbits/s) or to data transmission can thus be realized with virtually any desired data rate. Simplex, semiduplex or full duplex operation is possible for cordless phone systems, data transmission installations or telemetric systems with a local network structure, according to requirement. Such systems may also be used as a supplement in a local area network (LAN) when additional mobile subscribers are to be connected to the LAN.

In adaptive systems, successive adaption of the processing gain to the interference situation can easily be achieved by changing the length M of the spreading code sequence PN(t). The optimum number of demodulators can be adaptively put into use from the information on the number of instanteneous propagation paths so that best possible use can be made of the maximum diversity, which corresponds to a "maximum ratio combining". A variable data rate is thereby generally obtained in such systems.

In contrast to conventional radio transmission systems, the multipath spread is constructively used in the best possible way in buildings or on hilly terrain and there is at least a limited capability of operating the system with existing conventional radio systems at the same time in the same frequency band.

I claim:

1. Digital radio transmission system for a network of cells using a phase-coded spread spectrum technique, in which spectrum spreading of a transmitted information carrying signal takes place by multiplication of the information carrying signal with an auxiliary function and despreading of a received information carrying signal takes place by using this auxiliary function, comprising several user stations within a cell, each having a transmitter, a receiver for multipath reception and a control unit and further comprising a base station with a plurality of transmitter-receivers and a base control unit, characterized in that (a) exactly one set of several sets of spreading sequences used as the auxiliary function is allocated to each cell and an inverse of the one spreading sequence set is used as the despreading sequence;

(b) paired sequences of different sets have absolute values for normalized periodic cross-correlation functions which are less than one for all values;

(c) in sequences with a set, values for paired cross-correlation functions are minimized around a zero point of the paired cross-correlation functions;

(d) data synchronous generation of the transmitted information carrying signals take place in the base stations for all simultaneous connections; and (e) a data clock of a received information carrying signal is sued as a data clock of a transmitted information carrying signal within a given user station.

2. Radio transmission system according to claim 1, characterized in that the base station has a service channel which is provided for establishment of connections and is operated with a sequence selected from the set of spreading sequences, the sequence selected having an auto-correlation function which facilitates synchronization.

3. Radio transmission system according to claim 2, characterized in that the spreading sequences used are from the family of gold codes, and are grouped into 20 sets of 17 sequences each.

4. Radio transmission system according to claim 3, characterized in that generation of gold codes in code generators takes place by means of two linear feedback shift registers with programmable feedback taps, individual spreading sequences differing only in programmable initial values of the two shift registers in the case of fixed feedback taps.

5. Radio transmission system according to claim 4, characterized i that each code generator has a synchronization input by means of which the generation of the gold code can be controlled with respect to time.

6. Radio transmission system according to claim 5, characterized in that the receivers of the base station and of the user station are designed as multichannel correlation receivers and have an HF reception part, a N-channel despreader a N-channel reference code generator, a N-channel envelope or square law detector, a synchronization circuit, a L-channel demodulator and a combiner, with N corresponding to the number of reception channels and L corresponding to the number of demodulation channels.

7. Radio transmission system according to claim 6, characterized in that conversion of the received signal to an intermediate frequency signal takes place in the HF reception part.

8. Radio transmission system according to claim 7, characterized in that the despreader has a correlator which includes a mixer for each of said N channels for multiplying the intermediate frequency signal with a reference signal, and a band pass filter with a selectable bandwidth a reception code produced by the reference code generator being used for despreading the received signal.

9. Radio transmission system according to claim 8, characterized in that N versions of the same sequence code, which versions are shifted from one another in time, are produced in the reference code generator and in that these N versions are transmitted to the mixers of the despreaders.

10. Radio transmission system according to claim 9, characterized in that delay times of the N versions can be programmed individually for the N channels.

11. Radio transmission system according to claim 10, characterized in that output signals of the despreaders are transmitted to the demodulators and to the envelope or square law detectors with which signal intensity at outputs of the correlators is measured independently of received data, and control signals for the synchronization circuit are obtained from these measurements.

12. Radio transmission system according to claim 11, characterized in that integration of N envelope detector signals over an adjustable time takes place in the synchronization circuit and in that the N envelope detector signals which have thus been integrated undergo analog - digital conversion and are transmitted to a digital processor which controls the integration and calculates control signals for controlling the reference code generator.

13. Radio transmission system according to claim 12, characterized in that DPSK (=Differential Phase Shift Keying) is chosen as primary modulation and the demodulator is operated using DPSK and in that for obtaining data recovery which is insensitive to frequency offset and Doppler shift, correlator signals in each of the L channels are transmitted to attenuators and subsequently to a stage for differential demodulation.

14. Radio transmission system according to claim 13, characterized in that the stage for differential demodulation further includes a CCD delay line which delays an input signal to the differential demodulation stage by one bit duration Tb, a 90° phase shifter which generates a 90° phase shifted version of the input signal and two mixers which multiply the input signal and the phase sifted input signal, respectively, with the delayed input signal from the CCD delay line to provide output signals in two channels for transmission to an integration stage which integrates the the two channel output signals over one bit duration Tb.

15. Radio transmission system according to claim 14, characterized in that the integrated output signals of the two channels of all the L channels are summed an entered in a rectangular coordinate system, and a data value of each transmitted information bit is determined by a decision logic.

16. Radio transmission system according to claim 15, characterized in that an I/Q plane for the two channel output signals representing a signal pair is sub-divided into eight sectors and in that comparators are provided at an input of the decision logic, which comparators determine to which of the said sectors the incoming signal pair belongs.

17. Radio transmission system according to claim 16, characterized in that in the synchronization circuit, coarse synchronization takes place by measurement of an impulse response in the receiver.

18. Radio transmission system according to claim 17, characterized in that the reference code generator slides over the code generator of the transmitter and energy falling into a reception window of the receiver is calculated and an energy maximum is detected, and in that the reception window which contains several reception paths is centered around a point of the energy maximum.

19. Radio transmission system according to claim 18, characterized in that only a portion of the N reception paths of the receiver is used for centering the reception window and in that for fine synchronization, the remaining paths are used for continuously scanning the background impulse response of the channel by means of a scanning window which is wider than the duration of the impulse response and another position of an energy maximum is sought for a new centering of the reception window for fine synchronization.

20. Radio transmission system according to claim 18, characterized in that after each coarse synchronization, a verification based on a signal/noise ratio is carried out and optionally a new coarse synchronization.

21. Radio transmission system according to claim 20, characterized in that a criterion for loss of synchronism in the receiver is determined by a measurement based on the signal/noise ratio together with an error rate of the demodulator, a signal in the reception window and noise in the scanning window being determined.

22. Radio transmission system according to claim 1, characterized in that only a portion of N reception paths of the receiver is used for centering a reception window of the receiver around a point of maximum energy and in that for fine synchronization, the remaining paths are used for continuously scanning a background impulse response of the channel using a scanning window which is wider than the duration of an impulse response in the receiver and a position of an energy maximum is sought for a new centering of the reception window for fine synchronization.

23. Radio transmission system according to claim 1, characterized in that a criterion for loss of synchronism in the receiver is determined by a measurement based on a signal/noise ratio and an error rate of a receiver demodulator using a signal in a given reception window and noise in a background scanning window.

* * * * *